United States Patent Office 2,734,892
Patented Feb. 14, 1956

2,734,892
REMOVAL OF AlCl₃ CATALYST FROM FRIEDEL-CRAFTS REACTION MASSES

Richard Pence Carter, Beverly, N. J., assignor to Hercules Powder Company, Wilmington, Del., a corporation of Delaware No Drawing. Application September 10, 1952,
Serial No. 308,947

12 Claims. (Cl. 260—93.3)

This invention relates to AlCl₃-catalyzed Friedel-Crafts reactions, and more particularly, it relates to AlCl₃-catalyzed Friedel-Crafts reactions of the type involving polymerization. Still more particularly, it relates to a process for the inactivation and removal of AlCl₃ catalyst from the reaction masses obtained in AlCl₃-catalyzed Friedel-Crafts reactions.

The original observations of Friedel and Crafts related to the reaction involving the replacement of hydrogen in an aliphatic compound, amyl chloride. The reaction was effected in the presence of AlCl₃ as catalyst. The specific reaction referred to may be illustrated as follows:

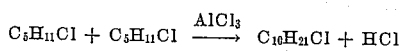

$$C_5H_{11}Cl + C_5H_{11}Cl \xrightarrow{AlCl_3} C_{10}H_{21}Cl + HCl$$

Following this early work, it was found that a variety of other metal halides were similar to AlCl₃ in having a catalytic effect on this reaction. Thus, the halides of aluminum, iron, zinc, boron, tin, titanium, bismuth, antimony, etc. were found to be effective. At the same time it was found that these catalysts possessed catalytic activity not only with respect to the above alkylation reaction but with respect to a rather wide variety of other reactions. Reactions made possible through the catalytic intervention of metal halides permit the synthesis of a great many compounds. Some of the more important of these reactions are the following: alkylation reactions, synthesis of ketones, preparation of carboxylic acid derivatives, aldehyde synthesis, preparation of primary and secondary amines, preparation of halogeno compounds, dehydration reactions, isomerization reactions, polymerization reactions, etc. The technical and patent literature tends to associate these diverse developments with the original work of Friedel and Crafts and the term "Friedel-Crafts reaction" has been expanded in scope with each new addition to the field of use of the metal halide catalysts. It is in this expanded or broad sense that the term is used herein.

It is the polymerization-type of Friedel-Crafts reaction which is of particular interest so far as this invention is concerned. As an example of this type there may be mentioned the polymerization of terpenes and copolymerization of terpenes and other unsaturated organic compounds in the presence of a Friedel-Crafts catalyst. Such reactions are generally carried out with the terpene or mixture thereof with an unsaturated organic compound dissolved in an unreactive solvent although the use of such unreactive solvent is not entirely necessary. In this manner, it is possible to make hard resins and a variety of oils, some of which have drying characteristics. Products intermediate in physical characteristics between hard resins and drying oils are also obtainable. Of all the Friedel-Crafts catalysts, AlCl₃ is preferably used as the polymerization catalyst for this type of polymerization. The reason for this preference lies in the fact that AlCl₃ is a particularly strong catalyst for this type of polymerization.

In the recovery of the polymeric constituents from the polymerization reaction mass or in the recovery of the desired product from any Friedel-Crafts reaction mass whether or not it is derived from a polymerization type reaction, it is necessary to remove the AlCl₃. Actually, this compound is believed to be present in the reaction mass in the form of an organic complex which must be decomposed and the inorganic material removed. One of the prior art procedures for effecting this is to wash the reaction mass with water, an aqueous acid or an aqueous base. U. S. 2,335,912; U. S. 2,391,293; and U. S. 1,938,320 describe a purification treatment of this type. Another procedure involves the use of an alcoholic or aqueous solution of NH₃. In this connection, U. S. 1,939,932 and U. S. 2,287,535 are informative. The former of these procedures is disadvantageous due to the inherent difficulty of emulsification connected with any water, aqueous acid, or aqueous base washing step. On the other hand, the latter procedure has the drawback that the recovered solvent will be contaminated with ethyl alcohol and it must be purified before it can be used since ethyl alcohol forms an inactive organic complex with anhydrous AlCl₃. With respect to prior art procedures generally, it is difficult to obtain a product, whether it be a polymer, alkylation product, or other type product, which has at the same time a low inorganic content and a very light color.

The use of Ca(OH)₂ as a precipitant for the AlCl₃ catalyst in reaction masses obtained in Friedel-Crafts reactions generally gives a gelatinous precipitate (apparently Al(OH)₃) which is exceedingly difficult if not impossible to remove. Under such conditions it is not possible to remove AlCl₃ completely from the reaction mixture. However, I have found further that, if a controlled amount of water is added to such a reaction mass in conjunction with the Ca(OH)₂, an easily filterable precipitate is formed and that by using the proper proportions of Ca(OH)₂ and water substantially complete removal of the AlCl₃ catalyst can be effected in this way. The precipitate obtained is apparently a mixture or complex of Al(OH)₃ and one or more hydrates of the CaCl₂ formed by neutralization with Ca(OH)₂ of the HCl resulting from hydrolysis of the AlCl₃. CaCl₂ is known to form a mono-, di-, and hexahydrate, and it may form still others. Mg(OH)₂ is equivalent to Ca(OH)₂ in this application and its chloride MgCl₂ is also known to form the same hydrates. As would be expected, the corresponding oxides may be used, CaO and MgO.

Thus, in accordance with this invention, a Friedel-Crafts hydrocarbon synthesis is carried out using a procedure known to the art for the particular type of Friedel-Crafts reaction involved. The desired reactant or reactants, which may be hydrocarbons or halogenated hydrocarbons, are contacted with anhydrous AlCl₃ as catalyst for a period of time sufficient to effect at least a substantial amount of the desired reaction. The reaction is preferably, although not necessarily, carried out with the reactant or reactants dissolved in an unreactive organic solvent. At the end of the reaction step, there is added to the reaction mass and thoroughly mixed therewith a limited amount of water and a limited amount of an alkaline material. The alkaline material used is preferably CaO or Ca(OH)₂ although MgO or Mg(OH)₂ may be employed, if desired. A precipitate forms which is believed to be Al(OH)₃ and one or more of the hydrates of CaCl₂ or MgCl₂ depending upon whether a calcium or magnesium compound has been used for the precipitation. The precipitate is then removed from the reaction mass by some suitable method as filtration, etc. Thereafter, the desired constituents of the reaction mass, for example, the polymeric constituents in the case of a polymerization-type reaction, are recovered therefrom in accordance with known procedures.

As stated above, a limited amount of alkaline material, i. e., CaO, Ca(OH)₂, MgO, Mg(OH)₂, is used to effect the precipitation. It has been found that a minimum of 1.5 moles of alkaline material per mole of AlCl₃ employed originally is required to effect a substantially complete removal of the AlCl₃. Although 1.5 moles of the alkaline material is effective, it is much preferred to employ from 3.6 to 4.5 moles of alkaline material per mole of AlCl₃. If an amount of alkaline material in the preferred range is employed, the precipitate formed is easily filtered. There is some tendency, if less than the preferred proportions are employed, for the precipitate to occlude the desired constituents of the reaction mass, thereby reducing the yield of the desired constituents. While more than 4.5 moles of alkaline material per mole of AlCl₃ may be employed, there is no particular advantage in using such excessive amounts. The proportions of water employed in the precipitation are critical. The water is employed in such an amount as to provide the water required to hydrate any oxide employed as alkaline material and to provide additionally from 0.75 to 15 moles of water per mole of AlCl₃. It is preferred to employ from 1.5 to 7.5 moles of water per mole of AlCl₃ in addition to that required to hydrate any oxide employed.

The process herein described is very satisfactory and provides numerous advantages over processes actually in commercial use and those which have been merely suggested in the literature. This process avoids the inherent difficulty of emulsification connected with any water, aqueous acid, or aqueous base washing step. Comparatively speaking, by using the subject process for removal of AlCl₃, it is much easier to obtain products having a low inorganic content and light color as compared with the prior art process involving use of a water, aqueous acid, or aqueous base washing step. In accordance with the newly discovered process, another desirable feature resides in the fact that the reaction mass is substantially anhydrous after removal of the precipitate and hence it is practically free of inorganic matter. It is only necessary to remove the solvent if any has been employed and to fractionate the remaining material. For example, in the case of a polymerization reaction mass, after removal of catalyst and solvent, if any, the remaining material is fractionated to separate the polymers from the monomers. As compared with the prior art process using alcoholic NH₃, the newly discovered process is advantageous in that it does not provide a solvent contaminated with ethyl alcohol. As pointed out above, ethyl alcohol tends to form an inactive organic complex with AlCl₃; hence, its presence must be avoided during the polymerization step.

While this invention is broad in its application, it is not applicable to all Friedel-Crafts reaction masses. It is applicable to all Friedel-Crafts hydrocarbon syntheses, which reactions include alkylation, isomerization, polymerization, dehydration and dehydrohalogenation reactions. Friedel-Crafts hydrocarbon syntheses may be further characterized by the fact that all the organic reagents involved in such reactions are hydrocarbons or halogenated hydrocarbons and it may therefore be said that the present invention is a process for inactivating and removing AlCl₃ catalyst from a solution of the reaction product produced by an AlCl₃-catalyzed Friedel-Crafts reaction wherein all the organic reactants are hydrocarbons or halogenated hydrocarbons. In general, this invention cannot be employed in connection with Friedel-Crafts reactions wherein oxygen-containing materials are found as, for example, in ketone syntheses.

The invention is particularly applicable to reaction masses obtained in Friedel-Crafts polymerization reactions. For that reason and for ease of presentation the invention will be described in relation to that particular type of Friedel-Crafts reaction. It will be understood, however, that the invention has broader significance as indicated hereinabove.

Having described the generic aspects of this invention, the following specific examples are given as specific embodiments thereof. These specific examples should not be construed as limiting the invention in any way. All parts and percentages are by weight unless otherwise indicated.

EXAMPLE 1

To 5000 parts of benzene in a round bottom flask equipped for agitation was added 200 parts of anhydrous AlCl₃ and the suspension cooled in an ice bath to 5 to 10° C. A 2500 part sample of unrefined sulfate turpentine (analyzing 0.5% S with a strong odor of organic sulfide) was added to the benzene suspension with agitation at such a rate as to keep the reaction temperature at 5 to 10° C. while cooling in an ice bath. About 2.5 hours were required for this addition. The resulting solution was agitated at 0 to 5° C. for 4 hours after the turpentine had been completely added. At the end of the 4-hour period, 453 parts of Ca(OH)₂ and 104 parts of water were added to the reaction mass. The resulting suspension was rapidly agitated at 60° C. In about 10 minutes the dark purple-red color changed to light yellow indicating decomposition of the catalyst. The reaction mass was stirred for 30 minutes after this color change and finally filtered with suction. The filtration was accomplished easily in a period of about 15 minutes. The solvent and unreacted constituents were removed from the filtrate by distillation using a final temperature of 220° C. at 20 mm. pressure. The resulting product was a resin having no organic sulfide odor. It had the following characteristics; color, M+ (U. S. Rosin Grade); softening point (drop), 72° C.; S, 0.03%; Cl, 0.6%; and ash (as sulfates), 0.005%. Two thousand one hundred twenty parts of resin was obtained by this procedure, amounting to a yield of 84+%.

Several additional examples were carried out in which sulfate turpentine was polymerized in benzene solution using AlCl₃ as catalyst. The per cent catalyst based on the turpentine was 8% in all cases except in Example 5 where it was 10%. The conditions of the examples were the same as those of Example 1 except as shown to be different in Table I. In this table there are summarized data relating to conditions of reaction and the results obtained.

Table I

| Example | Terpene | AlCl₃[2] | Ca(OH)₂[2] | Water[2] | Temp.,[1] °C. | Time Required to remove Color (minutes) | Yield, Percent | Drop Softening Point (° C.) | Color |
|---|---|---|---|---|---|---|---|---|---|
| 2 | Steam-distilled Unrefined Sulfate Turpentine[3] | 8 | 18 | 4.5 | 60 | 15 | 91 | 77 | X3 |
| 3 | ----do---- | 8 | 20 | 1.6 | [4],[6] 80 | [6] 10 | [7] 87 | 70 | WG |
| 4 | ----do---- | 8 | 20 | 8.6 | 25 | 10 | [7] 91 | 70 | K |
| 5 | Distilled Sulfate Turpentine[5] | 10 | 10 | 6.5 | 60 | 30 | 84 | 74 | X |
| 6 | Refined Sulfate Turpentine | 200 | 453 | 104 | 60 | 15 | 86 | 56 | N |

[1] Temp. during precipitation step.
[2] Parts by weight.
[3] Unrefined sulfate turpentine steam-distilled from aqueous base.
[4] Reflux temperature.
[5] Vacuum-distilled from solid caustic at 170-mm. pressure.
[6] No change in color of reaction mixture in 30 minutes at 60° C.
[7] Ca less than 10 p. p. m. and not detected; Al less than 5 p. p. m. but detected.

Several additional examples were carried out in which various terpenes were polymerized in benzene solution using AlCl₃ as catalyst. The per cent catalyst based on the terpene was 5% in all cases except in Example 7 where it was 10%. The conditions of the examples were the same as those of Example 1 except as shown to be different in Table II. In this table there are summarized data relating to conditions of reaction and the results obtained.

AlCl₃. As exemplary of the prior art, mention may be made of U. S. 1,938,320 which relates to the polymerization of "pine extracts" such as pine oil, dipentene, sylvestrene, turpentine, etc. in the presence of AlCl₃. Similarly, U. S. 1,939,932 shows the polymerization of pinene, dipentene, turpentine, cedar oil, limonene, etc. in the presence of AlCl₃. U. S. 2,264,774 is significant in that it shows that both α-piene and β-piene polymerize in the presence of AlCl₃.

Table II

| Example | Terpene | AlCl₃¹ | Ca(OH)₂¹ | Water¹ | Temp.,² °C. | Time Required to remove Color (minutes) | Yield, Percent | Drop Softening Point (° C.) | Color |
|---|---|---|---|---|---|---|---|---|---|
| 7 | Resin grade Dipentene | 10 | 22.5 | 4.0 | 80 | 10 | 70 | 61 | M |
| 8 | Pure Dipentene ³ | 125 | 500 | 50.0 | 50 | 25 | 93 | 111 | Y |
| 9 | do | 2.5 | 15.0 | 1.0 | 70 | 10 | 94 | 125 | Y |
| 10 | Pure β-Pinene | 10 | 22.5 | 4.0 | 60 | 10 | 94 | 145 | X |

¹ Parts by weight.
² Temp. during precipitation step.
³ Toluene used instead of benzene as solvent for the reaction.

Several additional examples were carried out in which terpenes were copolymerized with other unsaturated materials in benzene solution using AlCl₃ as catalyst. The per cent catalyst based on the terpene was 5% in all cases except in Example 13 where it was 10%. The conditions of the examples were the same as those of Example 1 except as shown to be different in Table III. In this table there are summarized data relating to conditions of reaction and the results obtained.

U. S. 2,335,912 relates particularly to the polymerization of β-piene or a β-piene terpene fraction containing β-piene in excess of 50% of the terpene present in the presence of a metal halide as catalyst. Terpinene and terpinolene are also shown to undergo polymerization in the presence of a metal halide catalyst although the reaction in each of these cases is much less vigorous than in the case of β-piene. The polymerization of turpentine in the presence of a metal halide catalyst under condi- Table III

| Example | Terpene | AlCl₃¹ | Ca(OH)₂¹ | Water¹ | Temp.,² °C. | Time Required to remove Color (minutes) | Yield, Percent | Drop Softening Point (° C.) | Color |
|---|---|---|---|---|---|---|---|---|---|
| 11 | Pure Dipentene-Butadiene Mixture.³,⁴ | 5 | 30 | 4.0 | ⁵ 40 | 10 | 93 | 175 | WG |
| 12 | Pure Dipentene-Styrene Mixture.⁶ | 10 | 22 | 4.0 | 60 | 10 | 95 | 135 | WG |
| 13 | Sulfate Turpentine-Coumarone Indene Mixture.⁷ | 8 | 18 | 4.5 | 60 | 15 | ⁸ 91.3 | 78 | X₃ |

¹ Parts by weight.
² Temp. during precipitation step.
³ Contained 15% butadiene.
⁴ Ethyl chloride used as solvent for the reaction.
⁵ Benzene added to replace ethyl chloride lost by evaporation.
⁶ Contained 15% styrene.
⁷ Contained 15% distilled solvent naphtha (63% polymerizable with Conc. H₂SO₄).
⁸ Based on polymerizable constituents.

The examples have illustrated the application of the invention to the preparation of various specific terpene polymers and copolymers. As indicated previously, the invention has much broader application. Considering polymerization reactions only, the invention may be applied to any reaction mass obtained as a result of an AlCl₃-catalyzed Friedel-Crafts polymerization reaction. Thus, the polymerization of olefins such as ethylene, propene, butene-1, butene-2, isobutene, etc. in the presence of AlCl₃ comes within the orbit of the invention. The polymerization of diolefins such as butadiene-1,3, isoprene, etc. is included. Similarly, the copolymerization of diolefins with olefins in the presence of AlCl₃ is included. Examples of such copolymerization are copolymerization of cyclohexene and isoprene, copolymerization of cyclohexadiene and pentene-2, etc. Similarly, the polymerization of aromatic unsaturated compounds is included. For example, the polymerization of styrene, indene, etc. in the presence of AlCl₃ is included.

The invention may be applied to the preparation of polymers from any terpene having the empirical formula C₁₀H₁₆. It is well known to the art that terpenes having this formula undergo polymerization in the presence of a Friedel-Crafts catalyst, specifically in the presence of tions to obtain an exceptionally high yield of solid polymer is the subject of U. S. 2,391,293.

The above-mentioned patents and the specific examples included in this application have related particularly to cyclic terpenes of the formula C₁₀H₁₆ and the polymerization thereof. It is pointed out, however, that this invention has application to the polymerization of acyclic terpenes such as allo-ocimene, myrcene, etc. as well as to the polymerization of the cyclic terpenes. In this connection it is pertinent to mention U. S. 2,373,419 which discloses that useful polymers can be made from allo-ocimene, myrcene, etc. by treatment thereof with a metal halide catalyst such as AlCl₃.

It will be apparent from a study of the aforementioned patent art that mixtures of terpenes may be utilized to form desirable polymers whether they be of the hard resin type, the oil type, or the types which are intermediate in physical properties. Thus, gum turpentine may be employed as a starting material. This material is said to have an average composition of 70% α-pinene and 30% β-pinene. Similarly, wood turpentine which contains a proportionately smaller amount of β-pinene may be used as a starting material. The subject invention is applicable to the use of any such mixtures of terpenes in the preparation of polymers therefrom.

Special mention may be made of the application of the invention to polymers made from sulfate turpentine, sulfate turpentine being the turpentine obtained as a byproduct in the pulping of wood by the so-called sulfate process. Sulfate turpentine in its unrefined form characteristically has a strong odor of organic sulfur compounds. Furthermore, as compared with regular wood or gum turpentine, it is comparatively dark in color. A particularly desirable feature of the present invention is that starting with an unrefined sulfate turpentine, it is possible by the application of the technique of this invention to produce a resinous polymer which is not only substantially free of inorganic material but which is entirely free of the odor of organic sulfur compounds and is light in color. Thus, it is possible to start with a relatively crude unrefined material and obtain a polymerized form thereof which is refined with respect to odor and color.

Similarly, this invention has application to the preparation of copolymers from any of the terpenes having the formula $C_{10}H_{16}$ mentioned hereinabove with any unsaturated organic compound copolymerizable therewith. In this connection, mention may again be made of U. S. 1,939,932 which discloses the copolymerization of terpenes and coumarone or indene or coumarone/indene mixtures in the presence of $AlCl_3$. U. S. 2,287,535 has a similar disclosure in this respect.

The copolymerization of a terpene hydrocarbon of the formula $C_{10}H_{16}$ and a halide of an unsaturated hydrocarbon is the subject of U. S. 2,354,775. As examples of such halides, vinyl chloride, vinyl bromide, vinylidene chloride, etc. are named. The copolymerization of terpene hydrocarbons of the formula $C_{10}H_{16}$ and 1,3-butadiene or a derivative thereof is the subject of application Serial No. 614,432 filed September 4, 1945, by A. L. Rummelsburg, now Patent No. 2,487,898. German Patent 278,468 is of some significance in that it shows the copolymerization of terpenes and styrene in the presence of $AlCl_3$. Other pertinent patents are U. S. 2,370,068 and U. S. 2,354,776 which relate to the copolymers of a terpene hydrocarbon and a glyceryl ester of an unsaturated fatty acid and to copolymers of a terpene hydrocarbon and a rosin ester, respectively.

The purification or catalyst-removing operation to which this invention is particularly directed may be applied to any polymerization reaction mass regardless of whether or not the polymerization has been effected with the monomer or monomers dissolved in an inert solvent. It is preferred, however, that the polymerization be carried out in the presence of an inert solvent since the presence of the solvent has some effect on the efficiency of the purification treatment, and in particular it is preferred to employ an aromatic hydrocarbon such as benzene, toluene, xylene, solvent naphtha, etc., or a halogenated hydrocarbon such as ethyl chloride, ethylene dichloride, sym. tetrachloroethane, o-dichlorobenzene, etc. as solvents. Inert solvents other than the preferred classes of solvents just mentioned may, of course, be employed. Thus, for example, gasoline, petroleum ether, V. M. & P. naphtha, etc. may be employed.

In precipitating the $AlCl_3$ catalyst it matters not whether the alkaline material ($Ca(OH)_2$) is added first or the water added first. Furthermore, it is quite satisfactory to make a paste of the two and add that to the reaction mass. Whichever procedure is employed, it is important to thoroughly mix the reaction mass after addition to insure substantially complete removal of the $AlCl_3$.

In general, it may be said that almost any temperature may be employed in carrying out the removal of $AlCl_3$. From a practical standpoint that means that any temperature from 0° C. up to the temperatures of decomposition of the reaction mass may be employed. From the standpoint of achieving rapid removal of the catalyst, however, it is helpful to know that the minimum temperature at which rapid removal of the catalyst is effected varies inversely with the mols of water added to the reaction mass per mol of $AlCl_3$ catalyst. Thus, at 0.75 to 1.5 mols of water per mol of $AlCl_3$ a temperature of at least 80° C. is required to give rapid removal of the catalyst. At 4.1 mols of water per mol of $AlCl_3$, a temperature of 60° C. or more is required to give rapid removal of the catalyst. At 7.5–15 mols of water per mol of $AlCl_3$, rapid removal of the catalyst can be effected at room temperature. It has been mentioned heretofore that the preferred amount of water to employ per mol of $AlCl_3$ is from 1.5 mols to 7.5 mols. In conjunction with operations within this range a temperature of 25° to 80° C. should be employed to obtain reasonably rapid removal of catalyst.

As indicated previously, an amount of water substantially in excess of 15 mols of water per mol of $AlCl_3$ cannot be used in accordance with the invention. Such practice gives rise to a reaction mass which is not anhydrous. Consequently, the polymer isolated therefrom will have a high inorganic content which is undesirable. Looking at the matter from a theoretical standpoint, since the highest known hydrates of $CaCl_2$ or $MgCl_2$ are those involving 6 molecules of water, it would appear that 9 mols of water per mol of $AlCl_3$ would be the maximum amount of water which could be added while retaining an anhydrous condition in the reaction mass. Practically, however, that limitation is not applicable. It appears that $CaCl_2.6H_2O$ or the corresponding $MgCl_2.6H_2O$ are hydroscopic enough to keep the resulting reaction mass substantially anhydrous up to the point where 15 mols of water have been added per mol of $AlCl_3$.

Although the examples herein have illustrated only the separation of the precipitate by filtration, there are numerous obvious expedients which can be employed in place thereof such as, for example, centrifugation, settling and decanting, etc.

This application is a continuation-in-part of application Serial No. 136,431, filed December 31, 1949, now abandoned.

What I claim and desire to protect by Letters Patent is:
1. A process for the removal of $AlCl_3$ catalyst from a reaction mass produced by an $AlCl_3$-catalyzed Friedel-Crafts polymerization reaction wherein all of the organic reactants are selected from the group consisting of ethylenically unsaturated hydrocarbons and halogenated hydrocarbons which comprises adding to said reaction mass an alkaline material selected from the group consisting of $CaO$, $Ca(OH)_2$, $MgO$ and $Mg(OH)_2$, and a liquid consisting of water; agitating the resulting mixture; and removing the resulting precipitate, said alkaline material being employed in an amount of at least 1.5 mole per mole of $AlCl_3$ present and said water being employed in excess of the amount of water necessary to hydrate any oxide employed as alkaline material, said excess being in an amount of from about 0.75 to 15 moles of water per mole of $AlCl_3$ present.

2. The process of claim 1 in which the reaction mass is produced by an $AlCl_3$-catalyzed Friedel-Crafts polymerization reaction in which the organic reactant is an ethylenically unsaturated hydrocarbon.

3. The process of claim 2 wherein the polymerization reaction is a copolymerization reaction between a terpene and an ethylenically unsaturated compound.

4. The process of claim 2 wherein the ethylenically unsaturated monomer is a terpene.

5. The process of claim 4 wherein $Ca(OH)_2$ is employed as the alkaline material.

6. The process of claim 4 wherein the alkaline material is employed in the amount of from about 3.6 to 4.5 moles per mole of $AlCl_3$.

7. The process of claim 6 wherein the water is employed in excess of the amount of water necessary to hydrate any oxide employed as alkaline material, said excess being in an amount of from about 1.5 to 7.5 moles of water per mole of AlCl₃ present.

8. The process of claim 7 wherein Ca(OH)₂ is employed as the alkaline material.

9. The process of claim 2 in which the reaction mass is produced by an AlCl₃-catalyzed Friedel-Crafts polymerization of sulfate turpentine.

10. The process of claim 9 in which the alkaline material is employed in the amount of from about 3.6 to 4.5 moles per mole of AlCl₃ and the excess of water is in an amount of from about 1.5 to 7.5 moles of water per mole of AlCl₃ present.

11. The process of claim 2 in which the reaction mass is produced by an AlCl₃-catalyzed Friedel-Crafts polymerization of β-pinene.

12. The process of claim 2 in which the reaction mass is produced by an AlCl₃-catalyzed Friedel-Crafts polymerization of dipentene.

References Cited in the file of this patent

UNITED STATES PATENTS

| | | |
|---|---|---|
| 2,119,957 | Nealon | June 7, 1938 |
| 2,555,221 | Burroughs | May 29, 1951 |